United States Patent [19]
Fernyhough et al.

[11] Patent Number: 5,700,417
[45] Date of Patent: Dec. 23, 1997

[54] PULTRUSION PROCESS FOR PREPARING FIBER-REINFORCED COMPOSITE ROD

[75] Inventors: Alan Fernyhough, Walton On Thames; Michael Fryars, Southampton, both of United Kingdom

[73] Assignee: Kabushiki Kaisha Kobe Seiko Sho, Kobe, Japan

[21] Appl. No.: 592,642

[22] Filed: Jan. 26, 1996

[30] Foreign Application Priority Data

Jan. 27, 1995 [GB] United Kingdom ............... 9301605

[51] Int. Cl.$^6$ ............... B29C 35/10; C08J 5/08; C08J 5/10; C08J 5/24
[52] U.S. Cl. ............... 264/477; 522/71; 522/81; 522/83; 522/88; 522/114; 522/135; 522/121; 522/142
[58] Field of Search ............... 522/81, 71, 83, 522/114, 120, 121, 117, 116, 136, 135, 122, 137, 141, 142, 143, 144; 264/477

[56] References Cited

U.S. PATENT DOCUMENTS

| | | | |
|---|---|---|---|
| 3,874,376 | 4/1975 | Dart et al. ............... | 128/90 |
| 4,276,352 | 6/1981 | Green ............... | 522/164 |
| 5,202,361 | 4/1993 | Zimmerman et al. ............... | 522/120 |
| 5,539,012 | 7/1996 | Klemarczyk et al. ............... | 522/182 |

*Primary Examiner*—Susan W. Berman
*Attorney, Agent, or Firm*—Oblon, Spivak, McClelland, Maier & Neustadt, P.C.

[57] ABSTRACT

The invention relates to a process for preparing a fibre-reinforced composite or a fibre-reinforced coating, which comprises impregnating reinforcing fibres with a radiation-curable composition comprising a polymerisable monomer and a polymer which is dissolved or dispersed in the monomer, and exposing the impregnated fibres to radiation to effect curing of the composition.

18 Claims, 1 Drawing Sheet

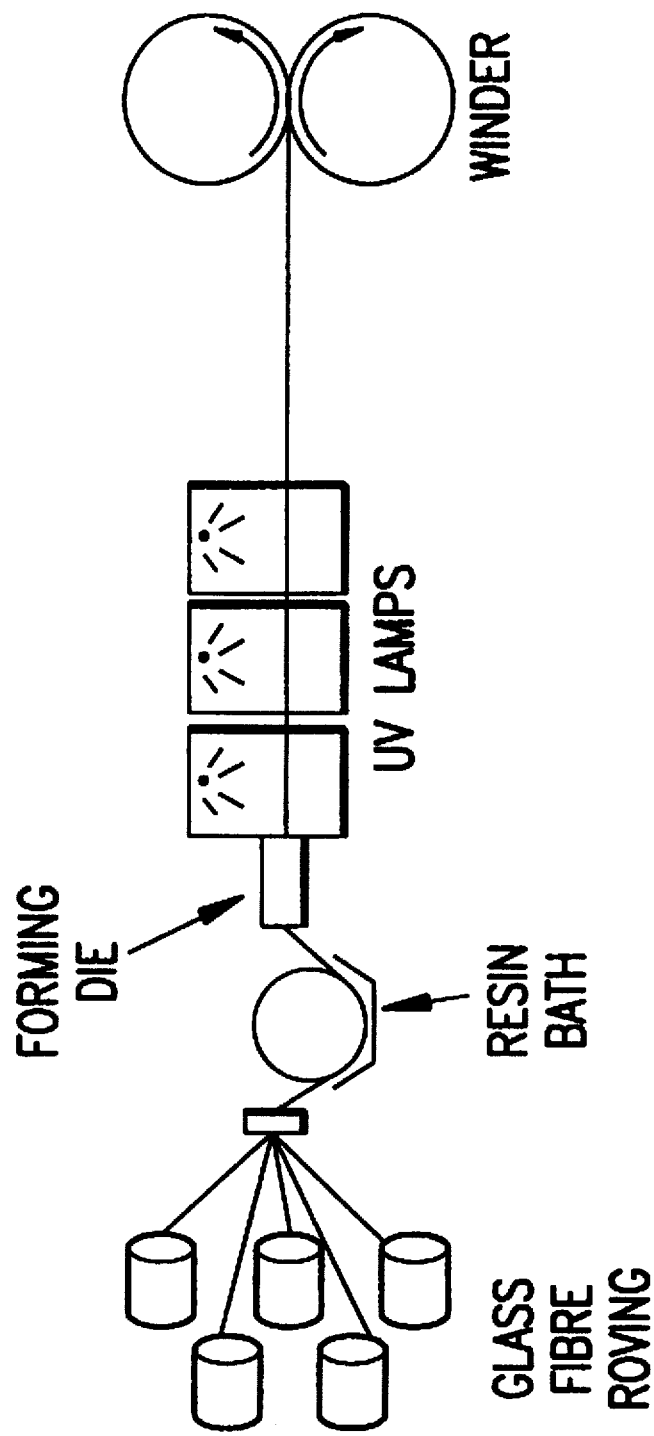

PULTRUSION PROCESS FOR PREPARING FIBER-REINFORCED COMPOSITE ROD

This invention relates to radiation-curable compositions and their use in particular for the preparation of fibre-reinforced composites and coatings.

Radiation-curable resin formulations are known which, in addition to the polymerisable monomer, also contain polymers for the improvement of certain properties. Such systems are known in the field of pressure-sensitive adhesives (see for example U.S. Pat. No. 4,243,500 and U.S. Pat. No. 5,202,361) and elastomer modified adhesive formulations (see for example EP-A-0 034 046 and WO 83/02450).

WO 82/00782 discloses an abrasion resistant coating composition. This composition is curable by actinic radiation, and comprises a pentaerythritol-based polyacrylate or polymethacrylate, a vinylchloride-vinylacetate containing polymer, and a photoinitiator.

A less common use of radiation curable compositions is in pultrusion processes. For example, EP-A-0 290 849 discloses a pultrusion process, in which a continuous reinforcing material, such as glass fibres, is passed through a bath to impregnate it with a curable liquid resin, and then pulled through a die in the course of which it is exposed to ultraviolet (UV) radiation to cure the resin matrix.

An object of the present invention is to provide a radiation-curable composition with improved properties, and which is particularly, but not exclusively, suitable for use in the production of composites or coatings, such as by a pultrusion process, e.g. as in EP-A-0 290 849.

The invention thus provides a process for preparing a fibre-reinforced composite or a fibre-reinforced coating, which comprises impregnating reinforcing fibres with a radiation-curable composition comprising a polymerisable monomer and a polymer which is dissolved or dispersed in the monomer, and exposing the impregnated fibres to radiation to effect curing of the composition.

BRIEF DESCRIPTION OF THE DRAWINGS

In the drawing unidirectional glass fiber rovings are continuously pulled through a resin bath and pass through a forming die (to remove excess resin and determine rod diameter). During this process the wetted fibers are exposed to ultraviolet (UV) irradiation from UV lamps for cure, and then wound up by a winder.

The accompanying drawing is a diagrammatic representation of apparatus suitable for carrying out the process of the invention.

Several types of electromagnetic radiation have been used for the curing of polymers and are suitable for use in the present invention. Ultra-violet light is common but also used are gamma rays, X-rays, electron beam and visible radiation. Infra-red and microwave radiation are also feasible but it must be recognised that they act in a different manner to the other radiations mentioned above. Microwave and IR radiation interact with appropriate molecules (through molecular vibrational modes) to raise their thermal energies and this then becomes the source of initiating and propagating reactions. With the other types of radiation there is no requirement for 'conversion' to thermal energy and active species (e.g. ions, radicals) are generated through the effects of the incident radiation on molecules (initiating or reactant, depending on whether an initiator is required). The invention is preferably carried out with UV or visible radiation, generally in the range of from 200 to 800 nm in wavelength. Electron beam (EB) radiation is of secondary interest. UV radiation is most preferred in the invention.

UV, visible and EB radiation induce photopolymerisation by photogeneration of initiating or propagating species. In EB, photogeneration is usually direct and without the need for a photoinitiator system (except in cationic photopolymerisable systems). However, with UV and visible incident radiation, photoinitiator(s) and/or photosensitisers are required (for both radical and cationic photopolymerisable systems). In the absence of such molecules or combinations, little or no polymerisation will occur on exposure to the radiation.

Polymerisable monomers are those molecules which can react together to form a polymer. In many cases, mixtures of polymerisable monomers will co-react with each other. The polymer-forming reactions are chain reactions involving radical or ionic intermediates and the classes of materials that commonly undergo such reactions either contain ethylenic unsaturation or reactive ring structures. Examples of unsaturated ethylenic materials are those with acrylate and methacrylate functionality, other vinyl or alkenyl functional materials such as styrene and its derivatives, unsaturated polyesters, vinyl esters, allyls, N-vinyl pyrrolidone, bismaleimides and vinyl ethers. Examples of reactive ring structures are cyclic ethers such as epoxide resins which are capable of such chain reactions via ionic ring-opening reactions. Depending on the overall functionality in the system polymerisation can produce linear or crosslinked structures. The presence of multifunctional polymerisable monomers (i.e. functionality >1) ordinarily leads to crosslinked structures and a greater amount of multifunctionality usually means a greater level of crosslinking.

Compositions containing acrylate functional monomers, either as the sole type of functional component, or as a mixture with any of the above types of materials containing unsaturation which is copolymerisable with the acrylate C=C double bond, are preferred. Compositions containing only acrylate functionality for polymerisation are most preferred. Acrylates may be monofunctional or multifunctional (>1 acrylate group per molecule). Usual monofunctional acrylates

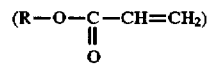

are those where R contains less than 25 C-atoms and may be an aliphatic chain (linear or branched) and/or cycloaliphatic and/or aromatic and/or heterocyclic ring structure and may also contain other bonds or functionalities such as amide(s), amine(s), urethane(s), urea(s), ether(s), hydroxyl or carboxylic acid.

Examples of preferred monofunctional acrylates are:
2-ethyl hexyl acrylate, hydroxy propyl acrylate, hydroxy ethyl acrylate, hydroxybutyl acrylate, octyl acrylate, iso-octyl acrylate, nonyl acrylate, iso-nonyl acrylate, decyl acrylate, iso-decyl acrylate, octyl/decyl acrylate (ODA), benzyl acrylate, cyclohexyl acrylate, t-butyl cyclohexyl acrylate, phenoxy ethyl acrylate, ethoxylated phenoxy ethyl acrylate, propoxylated phenoxy ethyl acrylate, nonyl phenoxy ethyl acrylate, butoxy ethyl acrylate, lauryl acrylate, isobornyl acrylate, dihydrocyclopentadiene acrylate, tetrahydrofuryl acrylate, ethoxyethoxy ethyl acrylate, β-carboxy ethyl acrylate, dimethyl amino ethyl acrylate commercial urethane acrylates such as GENOMER M220 (sold by Rahn Inc), epoxy acrylates such as EBECRYL III (a UCB Chemicals development product).

Preferred multifunctional acrylate components may again be aliphatic and/or cycloaliphatic and/or aromatic and/or heterocyclic based molecules also containing other functionalities/bonds mentioned above. Examples are: hexanedioldiacrylate (HDDA), tripropyleneglycol diacrylate (TPGDA), ethylene glycol diacrylate (EGDA), trimethylolpropanetriacrylate(TMPTA), ethoxylated and propoxylated TMPTA, epoxy soya bean oil acrylate (ESBOA), acrylated epoxy linseed oil, ethoxylated or propoxylated neopentyl glycol diacrylates, ethoxylated or propoxylated bisphenol A diacrylates, pentaerythrytol triacrylate, trishydroxyethyl isocyanurate triacrylate. In addition there are many types of commercial oligoacrylates such as epoxy acrylates (e.g. bisphenol A epoxy acrylates, epoxy novolac epoxy acrylates), polyester acrylates, polyether acrylates, urethane acrylates, silicone acrylates, and amine and melamine acrylates, which may be included. Details of such materials can be found in many text books on radiation curable formulations e.g. 'Chemistry & Technology of UV & EB Formulation For Coatings, Inks and Paints', Vol 2, Ch2, edited by P K T Oldring (ISBN 0.947798 10.2; Sita Technology, London UK). Some are contained within the examples.

Examples of suitable polymers are polystyrene, styrene acrylonitrile (SAN) and other styrene copolymers, polyvinyl chloride (PVC) and copolymers of vinyl chloride, acrylonitrile-butadiene-styrene (ABS), polymethyl methacrylate and copolymers, polyurethanes, polycarbonates, polyesters such as poly (ethylene-) and poly (butylene-) terephthalates, polyarylates, polyetherimide, polyethers and polyethersulphone, ionomers and elastomers. These polymers show some solubility in certain UV curable monomers and such soluble polymer-monomer combinations are most preferred. However, these polymers will also be insoluble in other radiation curable monomer systems and in such cases they can be added as powders dispersed in the monomer system. Polymers which are generally insoluble in most monomer systems, such as polyamides, polytetrafluoroethylene, polyphenylene sulphide, polyethylene and polypropylene can also be used as powders dispersed in the monomer.

Examples of elastomers suitable for use according to the invention are:

Polyurethanes, fluorinated rubber, isoprene-acrylonitrile copolymers, butadiene-acrylonitrile copolymers, co- and ter- polymers based on styrene and ethylenic comonomers such as styrene-butadiene copolymers (random and blocks), styrene-isoprene copolymers (random and blocks), styrene-ethylene-butene terpolymers, polybutenes, polyisobutylenes, polyisoprenes, polychloroprene, polyepichlorohydrin, chlorosulphonated polyethylene, copolymers of ethylene and/or propylene with other alkenes, silicone rubbers, polyvinyl ethers, acrylic copolymers, copolymers of ethylene with esters of acrylic or methacrylic acid, copolymers of ethylene with vinyl esters of carboxylic acids, polyvinylacetate, polyvinylbuyral. The elastomers and other polymers may bear functional groups but this is not a necessary prerequisite.

Preferred elastomers for imparting good folding durability to flexible composite systems are those with low tendencies to crystallise, with a Tg transition of <50 C and good solubilities in acrylic monomers. Particularly preferred elastomers exhibiting such characteristics are:

(1) ethylene copolymers where the comonomer is a vinyl ester of a carboxylic acid (e.g. ethylene-vinyl acetate (EVA)) or is an aliphatic ester or alkoxy ester of acrylic or methacrylic acid (e.g. ethylene-butyl acrylate (EBA)); terpolymers of the above where the third comonomer is an unsaturated acid or anhydride (e.g. acrylic or methacrylic acid or maleic anhydride) or is glycidyl methacrylate.

(2) acrylic polymers such as the homo- and co- polymers of alkyl or alkoxy esters of acrylic or methacrylic acid e.g. copolymers of methyl methacrylate with iso- or n- butyl acrylate or methacrylate or with ethyl acrylate or methacrylate.

Photoinitiators are generally required in UV curing compositions according to the invention, but may not be essential if other types of radiation are employed. Radical systems are preferred. Examples are α-hydroxy ketones, benzoin ethers, aceto-and benzo-phenones and ketones containing morpholine moieties, thioxanthones, 1,2-diketones, acyl phosphine oxides, photoactive oximes, titanocene derivatives and dye-sensitised co-initiator systems for visible light curing.

Cationic systems, though less preferred, may also be used. Examples of suitable photoinitiators for cationic systems are onium salts such as triarylsulphonium salts e.g. FX512 (3M Co), DEGACURE KI85 (Degussa Co), CYRACURE UVI 6974 and 6990 (Union Carbide); transition metal complexes such as IRGACURE 261 (Ciba Geigy).

The components of the radiation-curable composition may be used within a wide range of relative proportions, for example:

1 Functional Monomers/Oligomer or mixtures thereof: 100 parts by weight

2 Polymer: 2–150 parts, preferably 5–75 parts by weight, per hundred parts by weight of (1)

3 Photoinitiator: 0–5% by weight of total composition.

Other additives, usually at less than 10% by weight of total composition, include, for example, adhesion promoters, coupling agents, air release agents, anti-foaming agents, surfactants, fillers/pigments, wetting agents, lubricants, inhibitors, stabilisers, antioxidants.

Fibrous reinforcement (e.g. glass) is present in the cured composites at $V_f$s (fibre volume fraction) generally in the range of 0.05–0.9, usually 0.2–0.8 and preferably (when using the pultrusion process to produce continuous glass-fibre-reinforced profiles) 0.4–0.7. While glass is a preferred reinforcing fibre, others which may be used include: organic polymer fibres such as polypropylene, polyethylene, polyvinyl acetate, polyethylene terephthalate and other polyester fibres such as Vectran (a liquid crystal polyester fibre from Hoechst Co), acrylic fibres, cellulosic fibres, polyurethanes, nylon and aramid fibres, metal fibres and ceramic fibres. Mixtures of fibres (e.g. glass and aramid) may also be used.

Various processes may be used for composite preparation according to the invention. Pultrusion is preferred and this is a process where a reinforcing fibre is wetted with the resin formulation (e.g. in a resin bath at a suitable temperature such that resin viscosity is low enough for impregnation of the reinforcing fibres) and then pulled through die(s) to squeeze out excess resin and form the shape of the composite before and/or during the cure stage.

Other appropriate processes for composite structure preparation include filament winding where wetted continuous fibres are wound around a mandrel or other shape-forming structure, resin transfer moulding where pre-laid up fibres/mats in a mould are wetted by resin which is injected into the mould, laminate moulding/casting where fibres/mats are laid up in a mould and then wetted with resin e.g. by pouring or other dispensing and spreading methods.

To allow radiation curing (as opposed to the normal thermal or redox activated curing) of the resin, some modification of tooling etc. may be required. Moulds or dies may need to be made from materials which do not significantly interact with the incident radiation in those cases where curing takes place in the moulds or dies.

Also within the scope of the invention is a radiation-cured fibre-reinforced composite prepared by subjecting a radiation-curable composition as defined above to radiation curing in the presence of fibre reinforcement.

The process according to the invention preferably takes the form of a pultrusion process in which curing is effected in the course of pulling the impregnated fibres through a die.

The present invention is primarily concerned with the use of a UV curable formulation for the production of composites (in particular glass-reinforced composites). We have provided a flexible, durable (i.e. having folding durability), low cost, rapidly curable system, which can be extended to other applications such as stiff and higher strength composites.

A continuous UV-pultrusion process is, for example, used to produce a rod product. This is illustrated in the accompanying drawing. In this process, unidirectional glass fibre rovings are continuously pulled through a resin bath and pass through a forming die (to remove excess resin and determine rod diameter). During this process the wetted fibres are exposed to UV irradiation from UV lamps for cure, and then wound up by a winder. The product may be a rigid rod based on continuous glass fibre roving and a rapidly UV curable resin formulation. Optionally a second arrangement of 'resin bath-die-lamp(s)' may be present in series, before wind-up, to complete composite manufacture and/or control the fibre-resin volume ratio and/or allow application of an outer coating. The same resin formulation may be used as an outer coating. An important factor is the line speed which can be achieved, and this depends on rod diameter and UV lamp power, as well as other factors such as fibre-resin ratio, resin formulation (including photoinitiator) and transmission/scattering of radiation. The product may be used as a strength member in cables. The rod diameter is generally up to 5 mm, although in special cases diameters up to 10 mm could be used.

Some cable designs and applications need a more flexible or bendable strength member (often in addition to a rigid member in some designs). Compositions of the present invention meet the key requirements of such a flexible rod. Thus, the rod must be bendable or flexible (this is subjective, but important). The rod must have good folding durability (as measured by a MIT Folding Durability Tester according to ASTM D2176, e.g. a thousand or more cycles of folding, the actual number of cycles depending on rod diameter).

The resin system of the present invention is rapidly curable by UV to allow for fast line speeds in production, and when processed at such speeds the outgassing (weight loss on heating to 204° C. for 30 minutes) is generally desired to be less than 1.5%, preferably less than 1% (this weight loss is believed to be related to unreacted residual monomer), for a composite typically containing about 85 wt % fibre. These weight loss figures are based on the weight of the composite and higher weight losses may be expected for lower fibre content composites.

According to one aspect of the invention, a flexible elastomer or soft rubbery polymer is blended into a radiation curable formulation. The elastomer or polymer need not be reactive, but it can if necessary include some coreactivity, e.g. it may be a functional or reactive elastomer. As a result, intrinsic flexibility and durability are provided to the system with the correct choice of polymer, and also line speed and reactivity need not be jeopardised if good polymer solubility or compatibility is achieved in a fast reacting system.

In many cases the preferred elastomers are usually of lower cost than the reactive monomer components and this sometimes leads to significant formulation cost reductions.

The polymer which is used in the flexible compositions according to the invention is soluble or dispersible in the radiation-curable formulation, is preferably a low cost material, and contributes to folding durability and flexibility requirements. The radiation-curable matrix components (i.e. the composition apart from the polymer) desirably have a high reactivity to enable a fast line speed and concomitant good degree of cure, and are also preferably low cost materials. The unmodified composition (i.e. without added polymer) should be of a relatively low viscosity at the application temperature (to allow for an increased viscosity on addition of the polymer) and should dissolve or form a stable dispersion with the polymer modifier. The radiation-curable composition thus produced has a stable, usable viscosity so as, for example, to allow impregnation of fibres during processing or to allow film formation for coating at reasonable temperatures, e.g. up to about 150° C. but generally less than 100° C., usually less than 85° C.

We have found ethylene-vinylacetate (EVA) copolymers (with VA contents >25% to facilitate solubility and improve flexibility) to be particularly useful when combined with particular acrylate-based UV curable formulations. Depending on the nature of the resin formulation, lower VA content EVA's can be used if suitably soluble or dispersible.

The preferred acrylate monomer can be selected from aliphatic, ether, ester, epoxy, amine and urethane acrylates. Some are better than others for dissolution of certain elastomers. In order to dissolve the EVA materials, a monofunctional acrylate is usually required. Monoacrylates are of low viscosity but generally of low reactivity. Reactivity generally increases with functionality, but as functionality increases, solubility of EVA decreases and flexibility of the resulting polymer may also decrease. An oligoacrylate, e.g. a difunctional acrylate, may therefore be used as a further component in order to maintain the reactivity (capability of fast line speed and achieving good degree of cure) and to aid in maintaining rod strength and consolidation of fibres. Additional components may be added to optimise the balance of performance, line speed and cost.

The level of addition of oligoacrylate may be limited in that the EVA should preferably remain in solution at the bath temperature and the viscosity should not be so high as to prevent wetting and impregnation of the fibre reinforcement. However, this is not usually a severe restriction, since solubility is generally preserved at the addition levels required. If too much oligoacrylate is added, the rod may be too stiff and the MIT folding durability may be too low.

Although EVA is a preferred polymer for imparting good folding durability to flexible rods, other polymers can also be used. Any elastomer which forms a solution in acrylate monomer will be usable and if a solution is not attainable a dispersion may be suitable, though less preferred and less predictable.

Examples of other preferred soluble polymers are acrylic homo- and co- polymers such as those based on iso- or n-butyl acrylate/methacrylate and/or ethyl acrylate/methacrylate and their co- or ter-polymers with methyl methacrylate or styrene.

In some cases a monoacrylate is not necessarily required for the solubilisation of the modifying polymer/elastomer. For example, this is the case when epoxy soya bean oil acrylate (ESBOA) or a $C_{14}$ chain diacrylate is used as a component. ESBOA is a multifunctional branched acrylate with good reactivity and low cost, although it is quite viscous and so loadings of EVA are limited.

In addition to the production of composite rods as mentioned above, compositions of the present invention are more generally applicable, e.g. to sheets, other profiles, or simply as coatings.

In the production of strength members for use in cables, the cables may be finally produced by extruding an outer "jacket" of e.g. polyethylene (PE), PVC or polyurethane. PE is becoming more common and good adhesion of the strength member to PE (or other cabling material) is desirable. When EVA is used as the polymer, this desirable property is improved since EVA has good compatibility with PE. Acid modified EVA's can also be used and these will often improve adhesion generally. As a further modification, it is possible to blend into the composition specific tackifying resins, e.g. hydrocarbon resins, homo- and co- polymers of α-methyl styrene, esters of rosin, other rosin derivatives, and terpene resins, for improving adhesion, for improving adhesion to PE further (during cable extrusion). Such tackifiers can be dissolved in EVA/monoacrylate mixtures and be UV cured. The same composition can be used for an outer coating for rods to improve subsequent adhesion to PE (or other jacket materials), i.e. as a UV curable hot-melt adhesive coating.

The production of fibre-reinforced UV pultruded rods according to the process of the invention gives an advantage of lower cost because of the ability to process at more rapid line speeds (as evidenced by lower outgassing weight loss data). Lower costs also result from the use of polymers which are less expensive than the UV curable monomers. Other advantages which may be achieved are improved abrasion resistance and lubricity and improvements in mechanical properties such as strength, ductility, folding durability or thermal capability in some cases.

As shown by data in the following examples, flexible and durable (i.e. having better folding durability) composite rods are rapidly processed by UV pultrusion with resultant lower outgasing weight losses. This combination of advantages is most clearly seen in systems containing significant amounts of monofunctional monomers (acrylic) which polymerise relatively slowly (high outgassing weight loss) and have poor folding durability without the presence of elastomers. When elastomers are dissolved in such monofunctional acrylics, significant advantages are achieved.

The advantage resulting from lower material cost and faster production speeds is generally applicable to the use of elastomeric and non-elastomeric polymers. This advantage is most marked in mono-functional dominant systems which polymerise relatively slowly or have poor properties in the absence of added polymer.

A further advantage of using such polymers is the ability to manufacture low Vf composites and/or thicker rods more rapidly and more conveniently.

The invention is illustrated by the following examples.

EXAMPLE 1

A composite rod was prepared on a laboratory scale using a composition according to the invention as follows. 20 g of EVA copolymer (ESCORENE UL02825CC from Exxon) was predissolved in 100 g of iso-octyl acrylate (IOA) or isodecyl acrylate (IDA) at a temperature of about 50°–60° C. 10 g of Hexanedioldiacrylate (HDDA) was stirred in and then a photoinitiator (benzildimethylketal) was added in a proportion of 2% by weight based on the total weight of the composition. This mixture was then placed in a heated resin bath at about 70° C. and used to coat continuous glass fibre rovings in a UV pultrusion process similar to that illustrated in the accompanying drawing to produce a cured composite rod. Rod of 0.9 mm was produced using one UV lamp and 1170 tex roving. A line speed of 12.2 meters per minute was used to produce 0.9 mm rod (about 85% by weight glass).

The results of this and other similarly prepared formulations are given below in Table 1. For reference some unmodified systems are also shown (i.e. without added polymer, and in these cases the pre-dissolution stage described above is not necessary).

In a similar set of experiments, a 2 mm diameter rod is produced. The line speed was 61 to 76 meters per minute. About 4 to 6 UV lamps were used. Glass fibres were present at about 82–88 wt %. The results are shown in Table 2.

TABLE 1

0.9 mm rods made at 12.2 m per min with one lamp.

| Formulation (Wt Ratios) | Outgassing Wt loss % | MIT Folding Durability (cycles) | Rod Quality R | C |
|---|---|---|---|---|
| IDA/HDDA 10/1 | 2.4 | 1370 | P | P |
| IOA/HDDA 10/1 | 1.7 | — | P | P |
| IDA/HDDA/EVA 10/1/1 | 1.8 | 1920 | F | F |
| IDA/HDDA/PH4025 EVA 10/1/1/1 | 1.1 | | G | G |
| IDA/HDDA/EB80/EVA 10/1/1/1 | 1.2 | | G | G |
| IDA/HDDA/EB80/EVA 10/1/1/3 | 0.6 | | G | G |
| IDA/HDDA/EB80/ UL05540 10/1/1/3 | 1.0 1.0 | | G G | G G |
| IDA/HDDA/EB80/UL04533 10/1/1/3 | 1.0 | | G | G |
| IDA/HDDA/EB80/UL15028 10/1/1/3 | 1.0 | | G | G |
| IDA/HDDA/EB80/UL00728 10/1/13 | 0.8 | | G | G |
| IDA/HDDA/EB80/ELV4320 10/1/1/3 | 1.0 | | G | G |
| IDA/B702 10/1 | 1.2 | | F | F |
| IDA/CN111/EVA 6/6/2 | 0.9 | | F | F |
| IDA/SR2000/EVA 6/6/2 | 1.1 | | F | F |
| IOA/HDDA/EVA 10/1/2 | 0.9 | 1810 | G | G |
| IOA/HDDA/EVA 10/1/3 | 0.6 | | G | G |
| IOA/CN104/EVA 10/2/2 | 1.1 | 10850 | G | G |
| IOA/TPGDA/EVA 10/2/2 | 1.5 | | G | G |
| IOA/HDDA/B702 10/1/1 | 0.8 | | G | G |
| IOA/HDDA/ELV4260 10/1/3 | 0.6 | | G | G |
| IOA/HDDA/PH4770/EVA 10/1/1/2 | 1.1 | | G | G |
| IOA/CN965/EVA 7/3/1 | 0.7 | | G | G |
| EOEOEA/B702/TTEGDA 10/2/1 | 1.9 | 1320 | G | G |
| EOEOEA/B722/TTEGDA 10/2/1 | 2.1 | 1590 | G | G |
| PEA/B702 10/1 | 0.7 | | G | G |
| M220/B702 10/3 | 1.8 | | G | G |
| SR2000/CN111/EVA 10/10/2 | 0.6 | | F | F |

TABLE 2

2 mm diameter rod

| Formulation (Wt ratios) | Out-Gassing Wt loss | MIT Folding Durability (cycles) | Rod Quality R | C | Tensile Stress at Break(MPa) |
|---|---|---|---|---|---|
| IOA/HDDA/EVA 10/1/2 | 1.2 | 53000 | G | F | 966 |
| IOA/HDDA/EVA 10/2/2 | 0.7 | 19000 | G | G | 975 |

TABLE 2-continued

| | 2 mm diameter rod | | | | |
|---|---|---|---|---|---|
| Formulation | Out-Gassing | MIT Folding Durability | Rod Quality | | Tensile Stress at |
| (Wt ratios) | Wt loss | (cycles) | R | C | Break(MPa) |
| EHA/HDDA/EVA 10/1/2 | 0.9 | 59024 | G | G | 979 |
| ODA/HDDA/EVA 10/1/2 | 1.0 | 31922 | G | G | 867 |

Notes to Tables 1 and 2

Photoinitiator=benzil dimethyl ketal at 2% wt.

Resin bath temperatures: approx 70 C.

Glass fibre is present at about 82–88% by wt.

Outgassing weight loss is after 30 mins at 204 C.

MIT folding durability: number of cycles to failure according to ASTM D2176.

Rod Quality: R=roundness/shape; C=consolidation (binding together of fibres).

P=Poor; F=Fair; G=Good.

Materials' Abbreviations

IOA=iso-octyl acrylate.

ODA=octyldecyl acrylate (UCB Co.)

IDA=iso-decyl acrylate.

HDDA=hexanedioldiacrylate.

EHA=ethylhexyl acrylate.

CN104=Sartomer epoxy acrylate oligomer.

EB80=EBECRYL 80, a polyether acrylate from UCB Co.

PH4770=PHOTOMER 4770 (an amine acrylate from Henkel Co).

PH4025=PHOTOMER 4025 (an ethoxylated bisphenol A acrylate from Henkel Co).

CN111=epoxy soya bean oil acrylate, from Sartomer.

SR2000=$C_{14}$ chain diol diacrylate from Sartomer.

PEA=phenoxy ethyl acrylate.

EOEOEA=ethoxy ethoxy ethyl acrylate.

TPGDA=tripropyleneglycol diacrylate.

M220=GENOMER M220 urethane monoacrylate, from Rahn.

TTEGDA=tetraethyleneglycoldiacrylate

CN965=urethane acrylate oligomer.

EVA=ethylene vinyl acetate copolymer (MFI (melt flow index)=25, VA content 28%) e.g. Exxon ESCORENE UL02528 or a powdered equivalent version of this such as COATHILENE CN5175 from Hoechst Celanese Co.

Other EVAs mentioned specifically are ESCORENE UL05540 (MFI=55 VA=40%), UL04533 (MFI=45, VA=33%), UL15028 (MFI=150, VA=28%), UL00728 (MFI=7, VA=28%).

ELV 4000 series (e.g. ELVAX 4320 & 4260)=acid functional EVA copolymers from DuPont.

B702 and B722 are NEOCRYL acrylic copolymers from Zeneca Resins. B702 is an iso-butyl methacrylate copolymer and B722 is an ethyl methacrylate/methyl methacrylate copolymer.

Suitable formulations result from a balance of considerations. Formulations based on monoacrylate/diacrylate mixtures tend to give poor quality rods (e.g. fibres not bound together at high monoacrylate ratios and too stiff at high diacrylate ratios). Addition of elastomer (e.g. EVA) improves rod quality and flexibility and also reduces outgassing weight loss. (A lower outgassing weight loss could reflect in a faster line speed capability.)

EXAMPLE 2

Formulations containing other polymers and monomers are listed in Tables 3, 4, and 5. Here glass fibre reinforced composite rods were produced using the method of Example 1.

Phenoxy ethyl acrylate (PEA, SR339) has been found to be particularly useful for dissolving or dispersing polymers and this is illustrated in the examples of Table 3. Examples using monomers such as isobornyl acrylate, N-vinyl pyrrolidone, and N-methyl,vinyl acetamide, are given in Table 4.

When the radiation curable components are all monofunctional, as in the examples of Tables 3 and 4 (and also in some examples of Tables 1 and 2), then the composites formed with added polymer will exhibit thermoplastic characteristics. In this way a range of thermoplastic composites can be produced very rapidly and at relatively low temperatures (typical resin bath temperatures are 20°–150 C). The examples of Tables 3 and 4 illustrate such combinations in glass reinforced composite rods prepared by the UV pultrusion process usually using a resin bath temperature of about 70 C.

The use of a liquid composition (at the appropriate the resin bath temperature) in the process allows better and/or easier fibre wetting and allows rapid processing at conveniently low temperatures across a wide range of fibre-resin ratios. These are advantages over many methods used for thermoplastic composite manufacture where high temperatures (200 C or more) are often needed for fibre wetting and flow.

The nature and level of the added polymer, as well as the radiation curable components and the nature and level of the fibre, will determine the properties of the final composite. Thus, when elastomers are added to a radiation curable system based primarily or entirely on monofunctional flexibilising monomer, as in many of the examples of Tables 1 and 2, this can result in improvements in folding durability and other characteristics, as well as allowing faster production speeds. When more rigid thermoplastic polymers such as PS, SAN, etc. are added to similar radiation curable systems the resulting thermoplastic composites become less flexible or stiffer and may also exhibit a higher service temperature capability. Thus a tailoring of composite characteristics is possible.

In Tables 3 and 4 different rod diameters were prepared (by altering the diameter of the forming die) and also fibre volume (or weight) fractions were altered by control of the number of feeding glass fibre tows in relation to the forming die diameter. For example the use of four 1170–1200 tex glass fibre tows with a die diameter of 1.2–1.3 mm will produce composite rods (about 1.3 mm diameter) with about 55–60 wt % fibre. 0.9 mm diameter rods with about 85 wt % fibre were also produced (as in Table 1).

Outgassing measurements were made in some cases. It can be seen that the outgassing values, when expressed as a % weight loss of the matrix (that is of non-fibre components), are lower when polymer is added to the system. Furthermore in almost all cases the outgassing weight loss values calculated on the weight of the composite rod (as in Tables 1 and 2) is also lower. This implies that even faster line speeds are feasible for the production of composites with equivalent fibre contents and also for composites with even lower fibre contents in many cases, when compared to systems based on all monofunctional monomer without added polymer.

TABLE 3

Rods prepared according to Example 1 with phenoxy ethyl acrylate (PEA) as sole monomer and 2 parts benzil dimethyl ketal as photoinitiator.

| FORMULATION (PARTS BY WT) | ROD DIA (mm) | LINE SPEED (m/min) | WT % MATRIX (NON-FIBRE) | OUTGASSING % WT LOSS * (A) | (B) |
|---|---|---|---|---|---|
| PEA/ABS (85.5/12.5) | 1.3 | 7 | 43.9 | 1.8 | 4.1 |
| PEA/SAN (85.5/12.5) | 1.3 | 7 | 43.5 | 1.5 | 3.5 |
| PEA/PMMA (73/25) | 1.3 | 7 | 42.6 | 1.4 | 3.3 |
| PEA/PS (73/25) | 1.3 | 7 | 42.8 | 1.5 | 3.5 |
| PEA/PVC⁺ (93/5) | 1.3 | 7 | 43.3 | 1.4** | 3.3** |
| PEA/PET⁺ (85/13) | 1.3 | 10 | 43.5 | 2.0 | 4.7 |
| PEA/PS (70/28) | 0.9 | 15 | 15.1 | 0.7 | 4.6 |
| PEA/PC (93/5) | 0.9 | 9 | 17.4 | 1.1 | 6.2 |
| PEA/PS/ECR368LC⁺⁺ (63/25/10) | 0.9 | 9 | 15.8 | 0.8 | 4.9 |
| PEA (98) | 1.3 | 7 | 41.5 | 1.8 | 4.2 |
| PEA (98) | 0.9 | 9 | 17.3 | 1.3 | 7.5 |

\*:
(A) = outgassing weight loss after aging for 30 mins at 204 C., based on weight of composite.
(B) = outgassing weight loss after aging for 30 mins at 204 C. based on weight of matrix (ie non-fibre component).
\*\* = temperature schedule was 120 C. for PVC based systems.
⁺ = dispersion (others were solutions).
⁺⁺ = tackifying resin from Exxon.

TABLE 4

Rods prepared according to Example 1 with other monofunctional monomers and 2 parts of benzil dimethyl ketal as photoinitiator.

| FORMULATION PARTS BY WT | ROD DIA (mm) | LINE SPEED (m/min) | WT % MATRIX (NON-FIBRE) |
|---|---|---|---|
| IBOA/PVC (90.5/7.5) | 1.3 | 7 | 39.0 |
| IBOA/PEA/PVC (44.5/44.5/9) | 1.3 | 10 | 42.6 |
| NMVA/PVC (72.5/25) | 1.3 | 10 | 29.0 |
| NMVA/PES (73/25) | 0.9 | 10 | 6.9 |
| NVP/PEI (83/15) | 0.9 | 10 | 11.8 |
| NVP/PC (83/15) | 0.9 | 9 | 11.9 |

TABLE 5

Rods prepared according to Example 1 with formulations containing multifunctional monomers, and 2 parts of benzil dimethyl ketal as photoinitiator.

| FORMULATION (PARTS BY WT) | ROD DIA (mm) | LINE SPEED (m/min) | WT % MATRIX (NON-FIBRE) |
|---|---|---|---|
| PEA/TPGDA/PS (58.4/14.6/25) | 0.9 | 10 | 16.0 |
| PEA/TPGDA/SAN (68.4/17.1/12.5) | 0.9 | 10 | 16.5 |
| PEA/TPGDA/PMMA (43.8/29.2/25) | 0.9 | 10 | 15.6 |
| EA/TPGDA/EOEOEA/PP⁺ (49/44.1/4.9/5) | 1.3 | 7 | 45.5 |
| EA/TPGDA/EOEOEA/UHMWPE⁺ (49/44.1/4.9/5) | 1.3 | 7 | 44.1 |
| EA/TPGDA/EOEOEA/PTFE⁺ (49/44.1/4.9/5) | 1.3 | 7 | 42.8 |
| EA/TPGDA/EOEOEA/PA⁺ (49/44.1/4.9/5) | 1.3 | 7 | 45.8 |

⁺ = dispersion; (EA = epoxy acrylate oligomer such as CN104 from Cray Valley.

We claim:

1. A process for preparing a fiber-reinforced composite rod, for use as a strength member, which comprises:

(a) pulling continuous reinforcing fibers through a bath containing a radiation-curable composition so as to impregnate the fibers with the composition, wherein the composition comprises a monomer which is polymerizable under the effect of ultraviolet (UV) radiation, a polymer which is dissolved or dispersed in the monomer and a photoinitiator;

(b) pulling the impregnated fibers through a die downstream of the bath; and (c) exposing the impregnated fibers to UV radiation to effect polymerization of the monomer thereby producing a fiber reinforced composite.

2. A process according to claim 1, in which the monomer is N-vinyl pyrrolidone or N-methyl, vinyl acetamide or an acrylate monomer selected from aliphatic, ether, ester, epoxy, amine and urethane acrylates.

3. A process according to claim 2, in which the acrylate monomer consists of or includes a multifunctional acrylate.

4. A process according to claim 2, in which the acrylate monomer is a mixture of a monofunctional aliphatic acrylate and a multifunctional acrylate.

5. A process according to claim 2, in which the acrylate monomer consists of or includes a monofunctional acrylate selected from one or more of the following: β-carboxy ethyl acrylate, dimethylamino ethyl acrylate, 2-ethyl hexyl acrylate, hydroxy propyl acrylate, hydroxy ethyl acrylate, hydroxybutyl acrylate, octyl acrylate, iso-octyl acrylate, nonyl acrylate, iso-nonyl acrylate, decyl acrylate, isodecyl acrylate, octyl/decyl acrylate (ODA), benzyl acrylate, cyclohexyl acrylate, t-butyl cyclohexyl acrylate, phenoxy ethyl acrylate, ethoxylated phenoxy ethyl acrylate, propoxylated phenoxy ethyl acrylate, nonyl phenoxy ethyl acrylate, butoxy ethyl acrylate, lauryl acrylate, isobornyl acrylate, dihydrocyclopentadiene acrylate, tetrahydrofuryl acrylate, ethoxyethoxy ethyl acrylate, urethane acrylates and epoxy acrylates.

6. A process according to claim 2, in which, in addition to a monofunctional acrylate, a multi-functional acrylate monomer selected from one or more of the following is used: hexanedioldiacrylate (HDDA), tripropyleneglycol diacrylate (TPGDA), ethylene glycol diacrylate (EGDA), trimethylolpropanetriacrylate (TMPTA), ethoxylated and propoxylated TMPTA, epoxy soya bean oil acrylate (ESBOA), acrylated epoxy linseed oil, ethoxylated or propoxylated neopentyl glycol diacrylates, ethoxylated propoxylated bisphenol A diacrylates, pentaerythrytol triacrylate, trishydroxyethyl isocyanurate triacrylate, epoxy acrylates, polyester acrylates, polyether acrylates, urethane acrylates, silicone acrylates, and amine and melamine acrylates.

7. A process according to claim 6, wherein said epoxy acrylates are selected from the group consisting of bisphenol A epoxy acrylate and epoxy novalac epoxy acrylate.

8. A process according to claim 1, in which the polymer is an elastomer.

9. A process according to claim 8, in which the elastomer has a Tg of at most 50° C.

10. A process according to claim 8, in which the elastomer is an ethylene vinyl acetate (EVA) copolymer or an ethylene butyl acrylate (EBA) copolymer.

11. A process according to claim 10, in which the EVA copolymer has a vinyl acetate (VA) content of at least 18 mole %.

12. A process according to claim 11 in which the VA content is at least 25 mole %.

13. A process according to claim 8, in which the elastomer is an acrylic polymer or copolymer.

14. A process according to claim 13, in which the elastomer is a homo- or co- polymer of iso- or n-butyl acrylate or iso- or n- butyl methacrylate or ethyl acrylate or ethyl methacrylate or a co- or terpolymer of any of these with methyl methacrylate or styrene.

15. A process according to claim 1, in which the polymer is a thermoplastic polymer.

16. A process according to claim 15, in which the polymer is polystyrene or copolymer of styrene with copolymerizable ethylenically unsaturated monomers, polymethyl methacrylate or copolymer of methyl methacrylate with copolymerizable ethylenically unsaturated monomers, acrylonitrile-butadiene-styrene, polyvinyl chloride or copolymer of vinyl chloride with copolymerizable ethylenically unsaturated monomers polyester, polyether, polyurethane, polycarbonate, polyarylate, polyethersulphone or polyetherimide.

17. A process according to claim 1, in which the reinforcing fibres are glass fibres.

18. A fibre-reinforced composite or coating prepared by a process according to claim 1.

* * * * *

UNITED STATES PATENT AND TRADEMARK OFFICE
CERTIFICATE OF CORRECTION

PATENT NO. : 5,700,417
DATED : December 23, 1997
INVENTOR(S) : Alan FERNYHOUGH, et al.

It is certified that error appears in the above-indentified patent and that said Letters Patent is hereby corrected as shown below:

On the title page, item [30] should be:

```
--[30]    Foreign Application Priority Data
     Jan. 27, 1995   [GB]   United Kingdom .......9501605--
```

Signed and Sealed this

Twenty-fourth Day of February, 1998

Attest:

BRUCE LEHMAN

*Attesting Officer*          *Commissioner of Patents and Trademarks*